United States Patent
Nishida et al.

(10) Patent No.: US 7,161,743 B2
(45) Date of Patent: Jan. 9, 2007

(54) LIGHT DIFFUSING SHEET, OPTICAL ELEMENT AND IMAGE DISPLAY UNIT

(75) Inventors: Akihiro Nishida, Ibaraki (JP); Shuuji Yano, Ibaraki (JP); Hiroe Maeda, Toyohashi (JP); Takashi Kondou, Ibaraki (JP); Takezou Hatanaka, Ibaraki (JP); Takayuki Shigematsu, Ibaraki (JP)

(73) Assignee: Nitto Denko Corporation, Ibaraki (JP)

( * ) Notice: Subject to any disclaimer, the term of this patent is extended or adjusted under 35 U.S.C. 154(b) by 156 days.

(21) Appl. No.: 10/515,811

(22) PCT Filed: May 16, 2003

(86) PCT No.: PCT/JP03/06094

§ 371 (c)(1),
(2), (4) Date: Nov. 24, 2004

(87) PCT Pub. No.: WO03/100477

PCT Pub. Date: Dec. 4, 2003

(65) Prior Publication Data

US 2005/0157407 A1 Jul. 21, 2005

(30) Foreign Application Priority Data

May 28, 2002 (JP) .............................. 2002-153773

(51) Int. Cl.
*G02B 13/20* (2006.01)
*G03B 21/56* (2006.01)

(52) U.S. Cl. ...................................... 359/707; 359/443

(58) Field of Classification Search ................ 359/707, 359/443
See application file for complete search history.

(56) References Cited

FOREIGN PATENT DOCUMENTS

| CN | 1202634 A | 12/1998 |
|---|---|---|
| EP | 0 884 620 A2 | 12/1998 |
| EP | 1 160 591 | 12/2001 |
| JP | 9-127305 | 5/1997 |
| JP | 10-20103 | 1/1998 |
| JP | 2002-107512 | 4/2002 |
| JP | 2002-131507 | 5/2002 |
| WO | WO 95/31737 | 11/1995 |
| WO | WO 01/37007 | 5/2001 |

OTHER PUBLICATIONS

Chinese office action of corresponding patent application No. 03810685.X. issued Mar. 3, 2006.

*Primary Examiner*—Scott J. Sugarman
(74) *Attorney, Agent, or Firm*—Westerman, Hattori, Daniels & Adrian LLP

(57) ABSTRACT

A light diffusing sheet of a structure in which a light diffusing layer is formed on at least one surface of a transparent film, the light diffusing layer including a resin coat layer having a minute unevenness shape and a low refractive index layer having a refractive index lower than that of the resin coat layer on the surface having a minute unevenness shape thereof, whereby the sheet can retain antiglare property, shows almost no white blurring to be recognized due to surface scattering, exhibits almost no birefringence, and is excellent in adherence and durability even when applied to a high definition LCD.

6 Claims, 1 Drawing Sheet

[FIG.1]
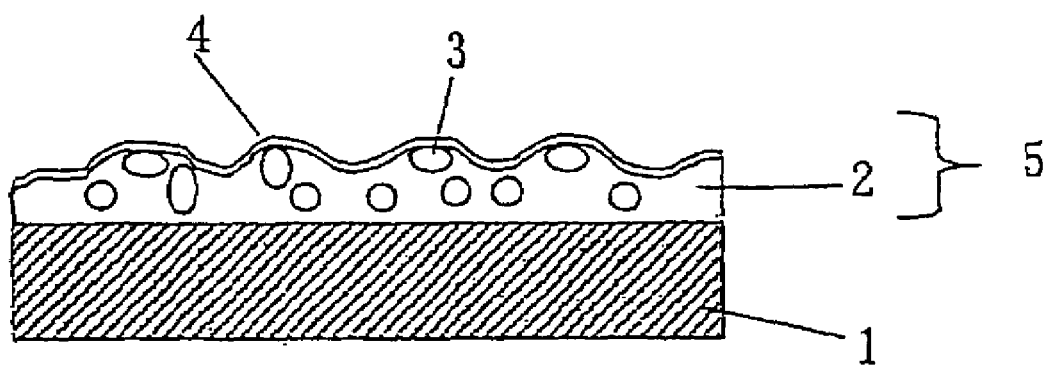

LIGHT DIFFUSING SHEET, OPTICAL ELEMENT AND IMAGE DISPLAY UNIT

FIELD OF THE INVENTION

The present invention relates to a light diffusion sheet used in order to suppress decrease of the screen visibility of a visual display, such as in liquid crystal displays (LCD), organic EL displays and PDP, and to an optical element having the light diffusion sheet concerned prepared thereto. Moreover, the present invention also relates to a visual display with the light diffusion sheet or the optical element concerned provided thereto.

BACKGROUND ART

Conventionally, in image viewing displays, such as LCD, an indoor lighting such as a fluorescent light, or incidence from sunlight from windows, or a reflection of operator's shadow etc. given to the viewing display surface sometimes aggravates visibility of pictures. Therefore, an light diffusion layer is provided, on display surface, in which minute unevenness structure showing antiglare property, formed in order to diffuse a surface reflected light, to stop a regular reflection of outdoor daylight and to prevent a reflection of outside environment (having antiglare property) for the purpose of improvement in the visibility of images. As a formation method of light diffusion layer, a method is mainly used in which a resin layer is formed from a coated layer having a resin containing fine-particles in dispersed state, because fine structure may be easily realized and at the same time excellent productivity may be realized by the method.

If a light diffusing layer is mounted on LCD, however, surface scattering occurs, which depends on conditions for forming the light diffusing layer, to thereby render a display screen in black display whitish, that is cause so-called white blurring, leading to a problem to reduce contrast in screen display.

For example, disclosed in JP-A No. 10-20103 is a light diffusing layer with improved antiglare property and the like, and having 60° gloss value on a surface thereof to be adjusted 90% or less paying attention to the 60° gloss value, whereas a great amount of particles small in average diameter is used in the light diffusing layer as stated in the published patent application, therefore causing white blurring. Further disclosed in WO 95/31737 is a light diffusing layer having 60° gloss value on a surface thereof to be adjusted 90% or less, whereas the light diffusing layer cannot be said to be sufficiently improved on suppression of white blurring.

As a method improving white blurring, a method has been available in which a low refractive index layer having a refractive index lower than that of a resin coat layer is provided on a surface of the resin coat layer with a minute unevenness structure to thereby impart an antireflection function thereto and to prevent reduction in contrast in screen display. In order to reveal an antireflection function, however, it is necessary to usually provide a uniform low refractive index layer having a thickness ¼ times a wavelength, and if an antireflection treatment is performed in a wet treatment on a minute unevenness structure, a thickness differs at peaks and valleys in minute unevenness structure due to leveling of the low refractive index layer, thereby disabling an antireflection function to be sufficiently revealed.

As a transparent film on which a light diffusing layer is formed, there have been generally employed films made of materials excellent in transparency, such as triacetyl cellulose, polyethylene terephthalate, polycarbonate and the like. Especially, a triacetyl cellulose film low in birefringence is mainstream as a material of a transparent film employed in a polarizing plate indispensable in LCD. In a case where being exposed to a humidified environment at a high temperature for a long time, however, a light diffusing sheet obtained by forming a minute unevenness shape on a surface of a triacetyl cellulose film has had a problem of peeling-off of and cracking in the light diffusing layer due to hydrolysis of the triacetyl cellulose film.

There has been available a transparent film that is not hydrolyzed in a humidified environment at a high temperature. As such a transparent film, there has been generally employed a stretched film having an improved mechanical strength. A stretched film generates a phase difference because of stretching, however. Therefore, in a case where a stretched film is used as a protective film for a polarizer, an inconvenience arises that a view angle characteristic is reduced. While recently, a norbornene-based resin film has been employed as a transparent film hard in revelation of a phase difference even after stretching and excellent in optical characteristic, the norbornene-based resin film on which a resin coat layer is provided for light diffusion is poor in adherence to the resin coat layer, being resulted in difficulty forming a light diffusing layer.

It is an object of the present invention to provide a light diffusing sheet, even in a case where the present invention is applied to a high definition LCD, maintaining antiglare property, showing almost no white blurring to be recognized due to surface scattering, exhibiting almost no birefringence, and being excellent in adherence and durability. It is another object of the present invention to provide an optical element in which the light diffusing sheet is provided and it is still another object of the present invention to provide an image display employing the optical element.

DISCLOSURE OF THE INVENTION

The present inventors have conducted serious studies in order to solve the tasks with a finding that the objects can be achieved with a light diffusing sheet exhibiting the following characteristics, having been resulted in completion of the present invention.

That is, the present invention is directed to a light diffusing sheet of a structure in which a light diffusing layer is formed on at least one surface of a transparent film, the light diffusing layer including a resin coat layer having a minute unevenness shape and a low refractive index layer having a refractive index lower than that of the resin coat layer on the surface having a minute unevenness shape thereof, wherein the transparent film contains (A) a thermoplastic resin having a substituted and/or unsubstituted imide group on a side chain and (B) a thermoplastic resin having a substituted and/or unsubstituted phenyl group, and a nitrile group on a side chain, wherein the low refractive index layer is formed with a material having a polysiloxane structure, and wherein a 60° gloss value on a surface of the low refractive index layer provided on the surface of the resin coat layer is 15% or more and 50% or less in a state where the resin coat layer and the low refractive index layer are laminated.

The light diffusion layer of the present invention is obtained by providing the low refractive index layer on the surface having a minute unevenness shape of the resin coat layer and can be imparted with an antireflection function by the low refractive index layer to prevent reduction in contrast in screen display from occurring and to suppress white blurring. The low refractive index layer is made of a material having a polysiloxane structure with a small thickness difference between a peak and a valley in the minute unevenness structure, thereby enabling a sufficient antireflection function to be exerted.

A revelation level of antireflection function of the low refractive index layer is different according to a roughness of a minute unevenness structure of the resin coat layer, wherein white blurring can be effectively suppressed by setting a 60° gloss value of a surface of the low refractive index layer provided on the resin coat layer to a value of 15% or more in a state where two layers including the resin coat layer and the low refractive index layer are provided. A 60° gloss value of a surface of the low refractive index layer is preferably 20% or more in a state where the two layers are provided. If a 60° gloss value of the surface of the low refractive index layer is less than 15% in a state where the two layers are provided, a contrast in screen display is reduced by white blurring due to scattering on a screen surface. On the other hand, if a 60° gloss value of the surface of the low refractive index layer is more than 50% in a state where the two layers are provided, antiglare property is greatly reduced to thereby cause a function as a light diffusing layer not to be exerted. A 60° gloss value of the surface of the low refractive index layer is more preferably 50% or less in a state where the two layers are provided. From the above discussion, in order to satisfy both characteristics of antiglare property and white blurring, a 60° gloss value of the surface of the low refractive index layer is in the range of from 15 to 50%, preferably in the range of from 20 to 50% and more preferably in the range of from 30 to 50% in a state where the two layers are provided.

A transparent film of the present invention contains a mixture of the thermoplastic resins (A) and (B) as a main component. The transparent film exhibits almost no birefringence, is low in optical degradation in an environment at a high temperature and a high humidity, is excellent in adherence to a resin coat layer and is excellent in durability.

In the light diffusing sheet, if a direction along which an in-plane refractive index of the transparent film is maximized is X axis, a direction perpendicular to X axis is Y axis, the thickness direction of the film is Z axis; refractive indexes in the respective axis directions are nx, ny and nz; and a thickness of the transparent film is d (nm) by definition, it is preferable that the following relations are met:

in-plane phase difference $Re=(nx-ny) \times d \leq 20$ nm and thickness direction phase difference $Rth=\{(nx+ny)/2-nz\} \times d \leq 30$ nm.

An in-plane phase difference of the transparent film is preferably 20 nm or less and more preferably 10 nm or less, and a thickness direction phase difference is preferably 30 nm or less and more preferably 20 nm or less. The transparent film in which phase differences are controlled in such a way, in case where a light diffusing sheet is applied to a polarizing plate, can reduce an influence thereof on a polarization state when a polarized light impinges. A thickness d of the transparent film, which is not specifically limited, is generally in the range of from 10 to 500 μm and preferably in the range of from 20 to 300 μm. It is especially preferable that the thickness is in the range of from 30 to 200 μm.

In the light diffusing sheet, a transparent film is preferably a biaxially stretched film. Though no specific limitation is imposed on a stretching means and a stretching magnification thereof, it is preferable to be stretched at an equal magnification in any of the MD direction and the TD direction. A stretching magnification is preferably in the range of from 0.5 to 3 times and more preferably in the range of from 1 to 2 times. Since a general plastic material reveals birefringence by stretching, it is necessary to use a plastic material in an unstretched state in order to maintain the polarization state. An unstretched film is, however, short in strength, causing difficulty in handling. A transparent film of the present invention, which contains a mixture of the thermoplastic resins (A) and (B) as a main component, can be a film excellent in strength since no birefringence is revealed in stretching.

The light diffusing sheet preferably includes a resin coat layer formed with an ultraviolet curing resin. The resin coat film can be efficiently formed in a simple operation in a curing treatment of irradiation with ultraviolet because of an ultraviolet curing resin.

Furthermore, the present invention relates to an optical element comprising the light diffusing sheet on one side or both sides of an optical element. It further relates to an image display comprising the optical element. A light diffusing sheet of the present invention can be used in various kinds of applications and for example, in an optical element, which in turn, is applied to various kinds of image displays.

BRIEF DESCRIPTION OF THE DRAWINGS

FIG. 1 is an example of a sectional view of a light diffusing sheet.

BEST MODE FOR CARRYING OUT OF THE INVENTION

Description will be given of preferred embodiments of the present invention below with reference to the accompanying drawings. FIG. 1 is a light diffusing sheet obtained by stacking a light diffusing layer 5, of a structure in which a low refractive index layer 4 is formed on a surface of a resin coat layer 2 having a minute unevenness structure on the surface, on a transparent film 1. The minute unevenness structure of the resin coat layer 2 is formed with fine particles 3. In addition, although FIG. 1 illustrates a case where the resin coat layer 2 consists of one layer, an light diffusion layer may also be formed of two or more resin coat layers by forming separately resin coat layer including fine particles between the resin coat layer 2 and the transparent film 1.

The transparent film 1 contains (A) a thermoplastic resin having a substituted and/or unsubstituted imide group on a side chain and (B) a thermoplastic resin having a substituted and/or unsubstituted phenyl group and a nitrile group on a side chain. A transparent protective film containing such thermoplastic resins (A) and (B) is described in, for example, in WO 01/37007. Note that a transparent protective film can further contain another resin in addition to the thermoplastic resins (A) and (B) as main components.

The thermoplastic resin (A) is a thermoplastic resin having a substituted and/or unsubstituted imide group on a side chain and a main chain thereof is of any type. A main chain thereof may be one including only carbon atoms, and an atom or atoms other than a carbon atom may be inserted between carbon atoms thereof. Alternatively, a main chain thereof may also be constructed of atoms other than a carbon atom. A main chain thereof may also preferably be a hydrocarbon or a substituted hydrocarbon. The main chain can be obtained by, for example, addition polymerization. To be concrete, the main chain is polyolefin or a polyvinyl. Moreover, a main chain thereof is obtained in condensation polymerization. For example, the main chain is obtained with ester bonds or amide bonds. A main chain thereof is preferably a polyvinyl skeleton obtained by polymerization of a substituted vinyl monomer.

Any of conventional methods can be adopted as a method introducing a substituted and/or unsubstituted imide group into a thermoplastic resin (A). Exemplified are: a method in which a monomer having the imide group is polymerized; a method in which various kinds of monomers are polymerized to form a main chain and thereafter, the imide group is introduced thereinto; a method in which a compound having the imide group is grafted onto a side chain. As a substituent on an imide group, there can be used conventionally known substituents each of which can substitute for hydrogen of an imide group. For example, an alkyl group or the like is used.

A thermoplastic resin (A) is preferably a multi-component copolymer such as a two- or more component copolymer having a repetition unit derived from at least one kind of olefin and a repetition unit having at least one kind of a substituted and/or unsubstitued maleimide structure. The olefin maleimide copolymer can be synthesized from olefin and a maleimide compound according to a known method. Synthetic methods are described in, for example, JP-A Nos. 5-59193, 5-195801, 6-136058 and 9-328523.

Examples of the olefins include: isobutene, 2-methyl-1-butene, 2-methyl-1-pentene, 2-methyl-1-hexene, 2-methyl-1-heptene, 1-isooctene, 2-methyl-1-octene, 2-ethyl-1-pentene, 2-ethyl-2-butene, 2-methyl-2-pentene, 2-methyl-2-hexene and the like. Among them, preferable is isobutene. The olefins may be either used alone or in combination of two or more kinds.

Examples of the maleimide compound include: maleimide, N-methylmaleimide, N-ethylmaleimide, N-n-propylmaleimide, N-1-propyl maleimide, N-n-butylmaleimide, N-s-butylmaleimide, N-t-butylmaleimide, N-n-pentylmaleimide, N-n-hexylmaleimide, N-n-heptylmaleimide, N-n-octylmaleimide, N-laurylmaleimide, N-stearylmaleimide, N-cyclopropylmaleimide, N-cyclobutylmaleimide, N-cyclopentylmaleimide, N-cyclohextylmaleimide, N-cycloheptylmaleimide, N-cyclooctylmaleimide, and the like. Among them, preferable is N-methylmaleimide. The maleimide compounds may be either used alone or in combination of two or more kinds.

In an olefin maleimide copolymer, a content of a repetition unit of olefin, on which no specific limitation is placed, is in the range of from 20 to 70 mol % and preferably in the range of from 40 to 60 mol % and more preferably in the range of from 45 to 55 mol % relative to a total repetition units of a thermoplastic resin (A). A content of a repetition unit of a maleimide structure is on the order of the range of from 30 to 80 mol % and preferably in the range of from 40 to 60 mol % and more preferably in the range of from 45 to 55 mol %.

A thermoplastic resin (A) contains a repetition unit of olefin and a repetition unit of a maleimide structure and can be constructed only with both repetition units. A repetition unit of a vinyl-based monomer in addition thereto may be contained in a proportion of 50 mol % or less. Examples of the vinyl-based monomer include: acrylic acid-based monomers such as methyl acrylate, butyl acrylate and the like; methacrylic acid-based monomers such as methyl methacrylate, cryclohexyl methacrylate and the like; vinyl ester monomers such as vinylacetate and the like; vinyl ether monomers such as methyl vinyl ether and the like; acid anhydrides such as maleic anhydride and the like; and styrene-based monomers such as styrene, α-methylstyrene, p-methoxystyrene and the like.

A weight-average molecular weight of a thermoplastic resin (A), on which no specific limitation is imposed, is on the order of the range of from $1 \times 10^3$ to $5 \times 10^6$. The weight-average molecular weight is preferably $1 \times 10^4$ or more and $5 \times 10^5$ or less. A glass transition temperature of a thermoplastic resin (A) is 80° C. or higher, preferably 100° C. or higher and more preferably 130° C. or higher.

A glutarimide-based thermoplastic resin can be used as a thermoplastic resin (A). Glutarimide-based resins are described in JP-A No. 2-153904 and the like. A glutarimide-based resin has a glutarimide structural unit and a structural unit of methyl acrylate or methyl methacrylate. The vinyl-based monomers can also be introduced into a glutarimide-based resin.

A thermoplastic resin (B) is one having a substituted and/or unsubstituted phenyl group and a nitrile group on a side chain. As main chains of a thermoplastic resin (B), there can be exemplified structures similar to those of a thermoplastic resin (A).

As methods introducing the phenyl group into a thermoplastic resin (B), exemplified are: a method in which a monomer having the phenyl group is polymerized; a method in which various kinds of monomers are polymerized to form a main chain and thereafter, the phenyl group is introduced thereinto; a method in which a compound having the phenyl group is grafted onto a side chain. As a substituent on an phenyl group, there can be used conventionally known substituents each of which can substitute for hydrogen of a phenyl group. For example, an alkyl group or the like is used. A method introducing a nitrile group into a thermoplastic resin (B) is similar to that with which a phenyl group is introduced into the resin.

A thermoplastic resin (B) is preferably a multi-component copolymer such as a two- or, three- or more component copolymer having a repetition unit derived from an unsaturated nitrile compound (a nitrile unit) and a repetition unit derived from a styrene-based compound (a styrene-based unit). For example, preferably used is an acrylonitrile-styrene-based copolymer.

As unsaturated nitrile compounds, exemplified are any of compounds each having a cyano group and a reactive double bond. Examples thereof include: α-substituted unsaturated nitrile, such as acrylonitrile, methacrylonitrile and the like; and nitrile compounds having α,β-disubstituted olefinic unsaturated bond such as fumalonitrile and the like.

As styrene-based compounds, exemplified are any of compounds each having a phenyl group and a reactive double bond. Examples thereof include: unsubstituted or substituted styrene-based compounds such as styrene, vinyltoluene, methoxystyrene, chlorostyrene and the like; and α-substituted styrene-based compounds such as α-methylstyrene and the like.

A content of a nitrile unit in a thermoplastic resin (B), on which no specific limitation is placed, is on the order of the range of from 10 to 70 wt % and preferably in the range of from 20 to 60 wt % and more preferably in the range of from 20 to 50 wt % relative to a total repetition units of a thermoplastic resin (B). It is especially preferable that a content of a nitrile unit is in the range of from 20 to 40 wt % and in the range of from 20 to 30 mol %. A content of a styrene-based unit is on the order of the range of from 30 to 70 wt % and preferably in the range of from 40 to 80 wt % and more preferably in the range of from 50 to 80 wt %. It is especially preferable that a content of a styrene-based unit is in the range of from 60 to 80 wt % and in the range of from 70 to 80 wt %.

A thermoplastic resin (B) contains the nitrile unit and the styrene-based unit and can be constructed only with both repetition units. A repetition unit of a vinyl-based monomer in addition thereto may be contained in a proportion of 50 mol % or less. Examples of the vinyl-based monomers include: the monomers exemplified in the case of a thermoplastic resin (A), a repetition unit of olefin, and repetition units of maleimide and substituted maleimide. As such thermoplastic resins (B), exemplified are: AS resin, ABS resin, ASA resin and the like.

A weight-average molecular weight of a thermoplastic resin (B), on which no specific limitation is imposed, is on the order of the range of from $1 \times 10^3$ to $5 \times 10^6$. The weight-average molecular weight is preferably $1 \times 10^4$ or more and $5 \times 10^5$ or less.

A ratio between thermoplastic resins (A) and (B) is adjusted depending on a phase difference required in a transparent protective film. As for the ratio, generally, a content of a thermoplastic resin (A) is preferably in the range of from 50 to 95 wt %, more preferably in the range of from 60 to 95 wt % and further more preferably in the range of from 65 to 90 wt % relative to a total amount of the resin in a film. A content of a thermoplastic resin (B) is preferably in the range of from 5 to 50 wt %, more preferably in the range of from 5 to 40 wt % and further more preferably in the range of from 10 to 35 wt % relative to a total amount of the resin in a film. Thermoplastic resins (A) and (B) are mixed by hot-melt kneading.

A thickness of a transparent film 1 is determined appropriately, and in general, it is approximately 10 to 500 μm so that it may have suitable thinness, or in viewpoint of workability, such as strength and handling property. Especially it is preferably 20 to 300 μm, and more preferably 30 to 200 μm.

A forming method of the resin coat layer 2 having minute unevenness structure surface is not especially limited so long as it is formed on the transparent film 1, but any proper methods may be adopted. For example, a method of forming minute unevenness structure on a surface of a material itself that forms the resin coat layer 2 may be mentioned. As illustrative examples, a method may be mentioned in which rough surfacing processing is beforehand given to the surface of the film used for formation of the above described resin coat layer 2 by proper manners, such as sandblasting, roll embossing, and chemical etching to give minute unevenness structure to the film surface. And, a method may also be mentioned in which additional coating of another resin coat layer is separately given on the resin coat layer 2, and minute unevenness structure is given by a transfer method with metal mold etc. onto the resin coat layer surface concerned. Furthermore, as shown in FIG. 1, minute unevenness structure is given by dispersing fine particles 3 in the resin coat layer 2 may be mentioned. In the formation method of these minute unevenness structures, two or more kinds of methods may be used in combination, and a layer may be formed in which different type of minute unevenness structures are compounded on the surface. In the formation method of the above described resin coat layer 2, a method of forming a resin coat layer 2 that contains the fine particles 3 dispersed therein is preferable in view of easiness and reliability of formation of minute unevenness structure.

Hereinafter, a method will be described in which fine particles 3 are included in a dispersed state to prepare a resin coat layer 2. As resins that form the resin coat layer 2 concerned, resins in which the fine particles 3 may be dispersed, strength sufficient as a coated layer after the resin coat layer is formed and transparency are demonstrated may be used without any limitation. Thermosetting resins, thermoplastic resins, ultraviolet curing resins, electron beam curing resins, two components mixing resins, etc. may be mentioned. And among them, an ultraviolet curing resin that may form an light diffusion layer efficiently through easy processing operation by curing processing with UV irradiation is suitable.

Among examples of ultraviolet curing resins are various kinds of resin, such as polyester based, acrylic based, urethane based, amide based, silicone based, and epoxy based resins, and ultraviolet rays curing type monomers, oligomers, and polymers etc. are also included. As an ultraviolet curing resin used preferably, for example, a resin that has functional groups with ultraviolet rays polymerizable property and a resin that includes, as a component, acrylic based monomers and oligomers having two or more, especially 3 to 6 of functional groups concerned may be mentioned. And, ultraviolet rays polymerization initiator is blended in ultraviolet curing resins.

In the formation of resin coat layer 2, additives, such as leveling agents, thixotropy agents, and antistatic agents may be used. Use of thixotropy agent (silica, mica, smectite, etc. having particle diameter of 0.1 or less μm) can easily form a minute unevenness structure on a resin coat layer (light diffusion layer) surface of projecting particles.

As fine particles 3, material having transparency, such as various metal oxide, glass, and plastic, may be used especially without any limitation. For example, among these examples are, inorganic oxide fine particles, such as silica, alumina, titania, zirconium oxide, calcium oxide, tin oxide, indium oxide, and antimony oxide; cross-linked or linear organic fine particles comprising various polymers, such as polymethylmethacrylates, polystyrenes, polyurethanes, acryl-styrene copolymers, benzoguanamine, melamines, and polycarbonates; and silicone based fine particles, etc. In addition, as inorganic fine particles, such as silica, crushed silica powder etc. may also be used and bead particles may also be used as organic fine particles. Use of organic fine particles is effective for suppressing glare. These fine particles 3 may be used independently or, two or more kinds may be selected and used in combination. An average particle diameter of the fine particles is 1 to 10 μm, and preferably 2 to 5 μm.

Formation method of the resin coat layer 2 containing the fine particles 3 is not especially limited, but proper methods may be adopted. For example, a resin (for example an ultraviolet curing resin: coating solution) comprising the fine particles 3 is coated on the above described transparent film 1, then curing processing being given after dried to form a resin coat layer 2 giving unevenness shape on the surface. Coating of the above described resin is carried out by proper methods, such as fountain, die coater, casting, spin coat, fountain metalling, and photogravure etc.

A content of the fine particles 3 in the coating solution, on which no specific limitation is placed, is preferably in the range of from 1 to 20 parts by weight relative to 100 parts by weight of a resin. A thickness of the resin coat layer 2, on which no specific limitation is placed, is preferably on the order of the range of from 1 to 10 μm and especially preferably in the range of from 2 to 5 μm.

The low refractive index layer 4 is provided on a surface having a minute unevenness shape of the resin coat layer 2. Used as a material of the low refractive index layer 4 is a material having a polysiloxane structure lower in refractive index than that of the resin coat layer 2.

As the materials forming a low refractive index layer, exemplified are: sol-gel based materials each using a metal alkoxide such as tetraethoxysilane, titanium tetaraethoxide or the like. Materials each forming a low refractive index material exemplified above may be in the forms of a polymer after polymerization, a monomer or an oligomer, which are a precursor of the polymer. The materials to be used can be fluorine containing compounds in order to give soil-resistance to a surface.

Perfluoro alkyl alkoxy silanes may be illustrated as sol-gel based materials including the fluorine groups. As perfluoro alkyl alkoxy silanes, for example, compounds expressed with a general formula (1): $CF_3(CF_2)_nCH_2CH_2Si(OR)_3$ (where R represents alkyl group of carbon numbers of 1 to 5, and n represents an integer of 0 to 12) may be mentioned. Specifically, for example, trifluoro propyl trimethoxy silane, trifluoro propyl triethoxy silane, trideca fluoro octyl trimethoxy silane, trideca fluoro octyl triethoxy silane, heptadeca fluoro decyl trimethoxy silane, and heptadeca fluoro decyl triethoxy silane may be mentioned. Among them compounds having the above-described n of 2 to 6 are preferable.

For forming a low refractive index layer, there may be added a sol obtained by dispersing silica, alumina, titania, zirconia, magnesium fluoride, ceria, or the like in an alcoholic solvent.

In addition, additives, such as metal salts and metallic compounds, may suitably be blended.

The low refractive index layer 4 can be formed on a surface of the resin coat layer 2 in a proper method. As methods for forming the layer, there can be adopted methods similar to those used in formation of the resin coat layer 2.

Note that in forming the low refractive index layer, a hydrophilicization treatment can be applied onto a surface of the resin coat layer 2. A hydrophilicization means, on which no specific limitation is placed, preferably adopted are surface treatment methods such as a corona discharge treatment, a sputtering treatment, low pressure UV irradiation, a plasma treatment and the like, for example. Moreover, there can be applied treatments to improve adherence, such as a chemical treatment using a sodium hydroxide aqueous solution or the like, and thin film coating using a cellulose-based material or a polyester-based material.

A thickness of the low refractive index layer is not especially limited, and is about 0.05 to 0.3 μm, and especially preferably 0.1 to 0.15 μm.

An optical element (not shown) can be adhered to the transparent film 1 of the light diffusing sheet of FIG. 1.

As example of optical elements, a polarizer may be mentioned. The polarizer is not especially limited but various kinds may be used. As a polarizer, for example, a film that is uniaxially stretched after having dichromatic substances, such as iodine and dichromatic dye, absorbed to hydrophilic high molecular weight polymer films, such as polyvinyl alcohol type film, partially formalized polyvinyl alcohol type film, and ethylene-vinyl acetate copolymer type partially saponified film; poly-ene type alignment films, such as dehydrated polyvinyl alcohol and dehydrochlorinated polyvinyl chloride, etc. may be mentioned. In these, a polyvinyl alcohol type film on which dichromatic materials such as iodine, dyes is absorbed and aligned after stretched is suitably used. Although thickness of polarizer is not especially limited, the thickness of about 5 to 80 μm is commonly adopted.

A polarizer that is uniaxially stretched after a polyvinyl alcohol type film dyed with iodine is obtained by stretching a polyvinyl alcohol film by 3 to 7 times the original length, after dipped and dyed in aqueous solution of iodine. If needed the film may also be dipped in aqueous solutions, such as boric acid and potassium iodide, which may include zinc sulfate, zinc chloride. Furthermore, before dyeing, the polyvinyl alcohol type film may be dipped in water and rinsed if needed. By rinsing polyvinyl alcohol type film with water, effect of preventing un-uniformity, such as unevenness of dyeing, is expected by making polyvinyl alcohol type film swelled in addition that also soils and blocking inhibitors on the polyvinyl alcohol type film surface may be washed off. Stretching may be applied after dyed with iodine or may be applied concurrently, or conversely dyeing with iodine may be applied after stretching. Stretching is applicable in aqueous solutions, such as boric acid and potassium iodide, and in water bath.

A transparent protective film is usually provided on one side or both sides of the above described polarizer to be used as a polarizing plate. As a transparent protective film, materials excellent in transparency, mechanical strength, heat stability, water shielding property, isotropy, etc. are preferable. As transparent protective films, a film of same material as the transparent film in the above described illustration may be used. As the above described transparent protective film, a transparent protective film whose both sides, surface side and backside, are formed from same polymer material may be used, and also a transparent protective film whose both sides are formed by different polymer materials etc. may be used. In many cases, it is preferable that the transparent protective film has small optical anisotropies, such as retardation. As polymers for forming the transparent protective film, triacetyl cellulose is most preferable. In providing the light diffusing sheet on one side or both sides of a polarizer (a polarizing plate), a transparent film of the light diffusing sheet can serve also as a transparent protective film of the polarizer.

As the opposite side of the polarizing-adhering surface above-mentioned transparent protective film, a film with a hard coat layer and various processing aiming for sticking prevention and diffusion or anti glare may be used. A hard coat processing is applied for the purpose of protecting the surface of the polarization plate from damage, and this hard coat film may be formed by a method in which, for example, a curable coated film with excellent hardness, slide property etc. is added on the surface of the transparent protective film using suitable ultraviolet curing resins, such as acrylic type and silicone type resins. Besides, a sticking prevention processing is applied for the purpose of adherence prevention with adjoining layer. In addition, the above described hard coat layer and sticking prevention layer etc. may be built in the protection film itself, and also they may be prepared as an optical layer different from the protection layer.

As optical elements, an optical film in which other optical elements (optical layers) is laminated to the above described polarizing plate may be used on the occasion of practical use. Although there is especially no limitation about the optical layers, one layer or two layers or more of optical layers, which may be used for formation of a liquid crystal display etc., such as a reflective plate, a transflective plate, a retardation plate (a half wavelength plate and a quarter wavelength plate included), and a viewing angle compensation film, may be used. Especially preferable polarizing plates are; a reflection type polarizing plate or a transflective type polarizing plate in which a reflective plate or a transflective reflective plate is further laminated onto a polarizing plate of the present invention; an elliptically polarizing plate or a circular polarizing plate in which a retardation plate is further laminated onto the polarizing plate; a wide viewing angle polarizing plate in which a viewing angle compensation film is further laminated onto the polarizing plate; or a polarizing plate in which a brightness enhancement film is further laminated onto the polarizing plate.

A reflective layer is prepared on a polarizing plate to give a reflection type polarizing plate, and this type of plate is used for a liquid crystal display in which an incident light from a view side (display side) is reflected to give a display. This type of plate does not require built-in light sources, such as a backlight, but has an advantage that a liquid crystal display may easily be made thinner. A reflection type polarizing plate may be formed using suitable methods, such as a method in which a reflective layer of metal etc. is, if required, attached to one side of a polarizing plate through a transparent protective layer etc.

As an example of a reflection type polarizing plate, a plate may be mentioned on which, if required, a reflective layer is formed using a method of attaching a foil and vapor deposition film of reflective metals, such as aluminum, to one side of a matte treated protective film.

Instead of a method in which a reflection plate is directly given to the protective film of the above-mentioned polarizing plate, a reflection plate may also be used as a reflective sheet constituted by preparing a reflective layer on the suitable film for the transparent film. In addition, since a reflective layer is usually made of metal, it is desirable that the reflective side is covered with a protective film or a polarizing plate etc. when used, from a viewpoint of preventing deterioration in reflectance by oxidation, of maintaining an initial reflectance for a long period of time and of avoiding preparation of a protective layer separately etc.

In addition, a transflective type polarizing plate may be obtained by preparing the above-mentioned reflective layer as a transflective type reflective layer, such as a half-mirror etc. that reflects and transmits light. A transflective type polarizing plate is usually prepared in the backside of a liquid crystal cell and it may form a liquid crystal display unit of a type in which a picture is displayed by an incident light reflected from a view side (display side) when used in a comparatively well-lighted atmosphere. And this unit displays a picture, in a comparatively dark atmosphere, using embedded type light sources, such as a back light built in backside of a transflective type polarizing plate. That is, the transflective type polarizing plate is useful to obtain of a liquid crystal display of the type that saves energy of light sources, such as a back light, in a well-lighted atmosphere, and can be used with a built-in light source if needed in a comparatively dark atmosphere etc.

The above-mentioned polarizing plate may be used as elliptically polarizing plate or circularly polarizing plate on which the retardation plate is laminated. A description of the above-mentioned elliptically polarizing plate or circularly polarizing plate will be made in the following paragraph. These polarizing plates change linearly polarized light into elliptically polarized light or circularly polarized light, elliptically polarized light or circularly polarized light into linearly polarized light or change the polarization direction of linearly polarization by a function of the retardation plate. As a retardation plate that changes circularly polarized light into linearly polarized light or linearly polarized light into circularly polarized light, what is called a quarter wavelength plate (also called λ/4 plate) is used. Usually, half-wavelength plate (also called λ/2 plate) is used, when changing the polarization direction of linearly polarized light.

Elliptically polarizing plate is effectively used to give a monochrome display without above-mentioned coloring by compensating (preventing) coloring (blue or yellow color) produced by birefringence of a liquid crystal layer of a super twisted nematic (STN) type liquid crystal display. Furthermore, a polarizing plate in which three-dimensional refractive index is controlled may also preferably compensate (prevent) coloring produced when a screen of a liquid crystal display is viewed from an oblique direction. Circularly polarizing plate is effectively used, for example, when adjusting a color tone of a picture of a reflection type liquid crystal display that provides a colored picture, and it also has function of antireflection. For example, a retardation plate may be used that compensates coloring and viewing angle, etc. caused by birefringence of various wavelength plates or liquid crystal layers etc. Besides, optical characteristics, such as retardation, may be controlled using laminated layer with two or more sorts of retardation plates having suitable retardation value according to each purpose. As retardation plates, birefringence films formed by stretching films comprising suitable polymers, such as polycarbonates, norbornene type resins, polyvinyl alcohols, polystyrenes, poly methyl methacrylates, polypropylene; polyallylates and polyamides; oriented films comprising liquid crystal materials, such as liquid crystal polymer; and films on which an alignment layer of a liquid crystal material is supported may be mentioned. A retardation plate may be a retardation plate that has a proper phase difference according to the purposes of use, such as various kinds of wavelength plates and plates aiming at compensation of coloring by birefringence of a liquid crystal layer and of visual angle, etc., and may be a retardation plate in which two or more sorts of retardation plates is laminated so that optical properties, such as retardation, may be controlled.

The above-mentioned elliptically polarizing plate and an above-mentioned reflected type elliptically polarizing plate are laminated plate combining suitably a polarizing plate or a reflection type polarizing plate with a retardation plate. This type of elliptically polarizing plate etc. may be manufactured by combining a polarizing plate (reflected type) and a retardation plate, and by laminating them one by one separately in the manufacture process of a liquid crystal display. On the other hand, the polarizing plate in which lamination was beforehand carried out and was obtained as an optical film, such as an elliptically polarizing plate, is excellent in a stable quality, a workability in lamination etc., and has an advantage in improved manufacturing efficiency of a liquid crystal display.

A viewing angle compensation film is a film for extending viewing angle so that a picture may look comparatively clearly, even when it is viewed from an oblique direction not from vertical direction to a screen. As such viewing angle compensation retardation plate, in addition, a film having birefringence property that is processed by uniaxial stretching or orthogonal biaxial stretching and a biaxially stretched film as inclined orientation film etc. may be used. As inclined orientation film, for example, a film obtained using a method in which a heat shrinking film is adhered to a polymer film, and then the combined film is heated and stretched or shrinked under a condition of being influenced by a shrinking force, or a film that is oriented in oblique direction may be mentioned. The viewing angle compensation film is suitably combined for the purpose of prevention of coloring caused by change of visible angle based on retardation by liquid crystal cell etc. and of expansion of viewing angle with good visibility.

Besides, a compensation plate in which an optical anisotropy layer consisting of an alignment layer of liquid crystal polymer, especially consisting of an inclined alignment layer of discotic liquid crystal polymer is supported with triacetyl cellulose film may preferably be used from a viewpoint of attaining a wide viewing angle with good visibility.

The polarizing plate with which a polarizing plate and a brightness enhancement film are adhered together is usually used being prepared in a backside of a liquid crystal cell. A brightness enhancement film shows a characteristic that reflects linearly polarization light with a predetermined polarization axis, or circularly polarization light with a predetermined direction, and that transmits other light, when natural light by back lights of a liquid crystal display or by reflection from a back-side etc., comes in. The polarizing plate, which is obtained by laminating a brightness enhancement film to a polarizing plate, thus does not transmit light without the predetermined polarization state and reflects it, while obtaining transmitted light with the predetermined polarization state by accepting a light from light sources, such as a backlight. This polarizing plate makes the light reflected by the brightness enhancement film further reversed through the reflective layer prepared in the backside and forces the light re-enter into the brightness enhancement film, and increases the quantity of the transmitted light through the brightness enhancement film by transmitting a part or all of the light as light with the predetermined polarization state. The polarizing plate simultaneously supplies polarized light that is difficult to be absorbed in a polarizer, and increases the quantity of the light usable for a liquid crystal picture display etc., and as a result luminosity may be improved. That is, in the case where the light enters through a polarizer from backside of a liquid crystal cell by the back light etc. without using a brightness enhancement film, most of the light, with a polarization direction different from the polarization axis of a polarizer, is absorbed by the polarizer, and does not transmit through the polarizer. This means that although influenced with the characteristics of the polarizer used, about 50 percent of light is absorbed by the polarizer, the quantity of the light usable for a liquid crystal picture display etc. decreases so much, and a resulting picture displayed becomes dark. A brightness enhancement film does not enter the light with the polarizing direction absorbed by the polarizer into the polarizer but reflects the light once by the brightness enhancement film, and further makes the light reversed through the reflective layer etc. prepared in the backside to re-enter the light into the brightness enhancement film. By this above-mentioned repeated operation, only when the polarization direction of the light reflected and reversed between the both becomes to have the polarization direction which may pass a polarizer, the brightness enhancement film transmits the light to supply it to the polarizer. As a result, the light from a backlight may be efficiently used for the display of the picture of a liquid crystal display to obtain a bright screen.

A diffusion plate may also be prepared between brightness enhancement film and the above described reflective layer, etc. A polarized light reflected by the brightness enhancement film goes to the above described reflective layer etc., and the diffusion plate installed diffuses passing light uniformly and changes the light state into depolarization at the same time. That is, the diffusion plate returns polarized light to natural light state. Steps are repeated where light, in the unpolarized state, i.e., natural light state, reflects through reflective layer and the like, and again goes into brightness enhancement film through diffusion plate toward reflective layer and the like. Diffusion plate that returns polarized light to the natural light state is installed between brightness enhancement film and the above described reflective layer, and the like, in this way, and thus a uniform and bright screen may be provided while maintaining brightness of display screen, and simultaneously controlling non-uniformity of brightness of the display screen. By preparing such diffusion plate, it is considered that number of repetition times of reflection of a first incident light increases with sufficient degree to provide uniform and bright display screen conjointly with diffusion function of the diffusion plate.

The suitable films are used as the above-mentioned brightness enhancement film. Namely, multilayer thin film of a dielectric substance; a laminated film that has the characteristics of transmitting a linearly polarized light with a predetermined polarizing axis, and of reflecting other light, such as the multilayer laminated film of the thin film having a different refractive-index anisotropy; an aligned film of cholesteric liquid-crystal polymer; a film that has the characteristics of reflecting a circularly polarized light with either left-handed or right-handed rotation and transmitting other light, such as a film on which the aligned cholesteric liquid crystal layer is supported; etc. may be mentioned.

Therefore, in the brightness enhancement film of a type that transmits a linearly polarized light having the above-mentioned predetermined polarization axis, by arranging the polarization axis of the transmitted light and entering the light into a polarizing plate as it is, the absorption loss by the polarizing plate is controlled and the polarized light can be transmitted efficiently. On the other hand, in the brightness enhancement film of a type that transmits a circularly polarized light as a cholesteric liquid-crystal layer, the light may be entered into a polarizer as it is, but it is desirable to enter the light into a polarizer after changing the circularly polarized light to a linearly polarized light through a retardation plate, taking control an absorption loss into consideration. In addition, a circularly polarized light is convertible into a linearly polarized light using a quarter wavelength plate as the retardation plate.

A retardation plate that works as a quarter wavelength plate in a wide wavelength ranges, such as a visible-light region, is obtained by a method in which a retardation layer working as a quarter wavelength plate to a pale color light with a wavelength of 550 nm is laminated with a retardation layer having other retardation characteristics, such as a retardation layer working as a half-wavelength plate. Therefore, the retardation plate located between a polarizing plate and a brightness enhancement film may consist of one or more retardation layers.

In addition, also in a cholesteric liquid-crystal layer, a layer reflecting a circularly polarized light in a wide wavelength ranges, such as a visible-light region, may be obtained by adopting a configuration structure in which two or more layers with different reflective wavelength are laminated together. Thus a transmitted circularly polarized light in a wide wavelength range may be obtained using this type of cholesteric liquid-crystal layer.

Moreover, the polarizing plate may consist of multi-layered film of laminated layers of a polarizing plate and two of more of optical layers as the above-mentioned separated type polarizing plate. Therefore, a polarizing plate may be a reflection type elliptically polarizing plate or a semi-transmission type elliptically polarizing plate, etc. in which the above-mentioned reflection type polarizing plate or a transflective type polarizing plate is combined with above described retardation plate respectively.

Although a laminating of the above described light diffusion sheet to the optical element and of the various optical layer to the polarizing plate may be formed by a method in which laminating is separately carried out sequentially in manufacturing process of a liquid crystal display etc., an optical film in a form of being laminated beforehand has an outstanding advantage that it has excellent stability in quality and assembly workability, etc., and thus manufacturing processes ability of a liquid crystal display etc. may be raised. Proper adhesion means, such as an adhesive layer, may be used for laminating. On the occasion of adhesion of the above described polarizing plate and other optical films, the optical axis may be set as a suitable configuration angle according to the target retardation characteristics etc.

In the polarizing plate mentioned above and the optical film in which at least one layer of the polarizing plate is laminated, which at least one layer of the optical element is laminated with the light diffusion sheet, while a layer not prepared the light diffusion sheet an adhesive layer may also be prepared for adhesion with other members, such as a liquid crystal cell etc. As pressure sensitive adhesive that forms adhesive layer is not especially limited, and, for example, acrylic type polymers; silicone type polymers; polyesters, polyurethanes, polyamides, polyethers; fluorine type and rubber type polymers may be suitably selected as a base polymer. Especially, a pressure sensitive adhesive such as acrylics type pressure sensitive adhesives may be preferably used, which is excellent in optical transparency, showing adhesion characteristics with moderate wettability, cohesiveness and adhesive property and has outstanding weather resistance, heat resistance, etc.

Moreover, an adhesive layer with low moisture absorption and excellent heat resistance is desirable. This is because those characteristics are required in order to prevent foaming and peeling-off phenomena by moisture absorption, in order to prevent decrease in optical characteristics and curvature of a liquid crystal cell caused by thermal expansion difference etc. and in order to manufacture a liquid crystal display excellent in durability with high quality.

The adhesive layer may contain additives, for example, such as natural or synthetic resins, adhesive resins, glass fibers, glass beads, metal powder, fillers comprising other inorganic powder etc., pigments, colorants and antioxidants. Moreover, it may be an adhesive layer that contains fine particle and shows light diffusion nature.

Proper method may be carried out to attach an adhesive layer to the optical element, such as the polarizing plate, the optical film. As an example, about 10 to 40 weight % of the pressure sensitive adhesive solution in which a base polymer or its composition is dissolved or dispersed, for example, toluene or ethyl acetate or a mixed solvent of these two solvents is prepared. A method in which this solution is directly applied on a polarizing plate top or a optical film top using suitable developing methods, such as flow method and coating method, or a method in which an adhesive layer is once formed on a separator, as mentioned above, and is then transferred on a polarizing plate or an optical film may be mentioned. An adhesive layer may also be prepared on each layer as a layer in which pressure sensitive adhesives with different composition or different kind etc. are laminated together. Thickness of an adhesive layer may be suitably determined depending on a purpose of usage or adhesive strength, etc., and generally is 1 to 500 μm, preferably 5 to 200 μm, and more preferably 10 to 100 μm.

A temporary separator is attached to an exposed side of an adhesive layer to prevent contamination etc., until it is practically used. Thereby, it can be prevented that foreign matter contacts adhesive layer in usual handling. As a separator, without taking the above-mentioned thickness conditions into consideration, for example, suitable conventional sheet materials that is coated, if necessary, with release agents, such as silicone type, long chain alkyl type, fluorine type release agents, and molybdenum sulfide may be used. As a suitable sheet material, plastics films, rubber sheets, papers, cloths, no woven fabrics, nets, foamed sheets and metallic foils or laminated sheets thereof may be used.

In addition, in the present invention, ultraviolet absorbing property may be given to the above-mentioned each layer, such as a polarizer for a polarizing plate, a transparent protective film and an optical film etc. and an adhesive layer, using a method of adding UV absorbents, such as salicylic acid ester type compounds, benzophenol type compounds, benzotriazol type compounds, cyano acrylate type compounds, and nickel complex salt type compounds.

An optical element prepared with the light diffusion sheet of the present invention may be preferably used for manufacturing various equipment, such as liquid crystal display, etc. Assembling of a liquid crystal display may be carried out according to conventional methods. That is, a liquid crystal display is generally manufactured by suitably assembling several parts such as a liquid crystal cell, optical films and, if necessary, lighting system, and by incorporating driving circuit. In the present invention, except that an optical film by the present invention is used, there is especially no limitation to use any conventional methods. Also any liquid crystal cell of arbitrary type, such as TN type, and STN type, π type may be used.

Suitable liquid crystal displays, such as liquid crystal display with which the above-mentioned optical film has been located at one side or both sides of the liquid crystal cell, and with which a backlight or a reflective plate is used for a lighting system may be manufactured. In this case, the optical film by the present invention may be installed in one side or both sides of the liquid crystal cell. When installing the optical films in both sides, they may be of the same type or of different type. Furthermore, in assembling a liquid crystal display, suitable parts, such as diffusion plate, antiglare layer, antireflection film, protective plate, prism array, lens array sheet, light diffusion plate, and backlight, may be installed in suitable position in one layer or two or more layers.

Subsequently, organic electro luminescence equipment (organic EL display) will be explained. Generally, in organic EL display, a transparent electrode, an organic luminescence layer and a metal electrode are laminated on a transparent substrate in an order configuring an illuminant (organic electro luminescence illuminant). Here, a organic luminescence layer is a laminated material of various organic thin films, and much compositions with various combination are known, for example, a laminated material of hole injection layer comprising triphenylamine derivatives etc., a luminescence layer comprising fluorescent organic solids, such as anthracene; a laminated material of electronic injection layer comprising such a luminescence layer and perylene derivatives, etc.; laminated material of these hole injection layers, luminescence layer, and electronic injection layer etc.

An organic EL display emits light based on a principle that positive hole and electron are injected into an organic luminescence layer by impressing voltage between a transparent electrode and a metal electrode, the energy produced by recombination of these positive holes and electrons excites fluorescent substance, and subsequently light is emitted when excited fluorescent substance returns to ground state. A mechanism called recombination which takes place in an intermediate process is the same as a mechanism in common diodes, and, as is expected, there is a strong non-linear relationship between electric current and luminescence strength accompanied by rectification nature to applied voltage.

In an organic EL display, in order to take out luminescence in an organic luminescence layer, at least one electrode must be transparent. The transparent electrode usually formed with transparent electric conductor, such as indium tin oxide (ITO), is used as an anode. On the other hand, in order to make electronic injection easier and to increase luminescence efficiency, it is important that a substance with small work function is used for cathode, and metal electrodes, such as Mg—Ag and Al—Li, are usually used.

In organic EL display of such a configuration, an organic luminescence layer is formed by a very thin film about 10 nm in thickness. For this reason, light is transmitted nearly completely through organic luminescence layer as through transparent electrode. Consequently, since the light that enters, when light is not emitted, as incident light from a surface of a transparent substrate and is transmitted through a transparent electrode and an organic luminescence layer and then is reflected by a metal electrode, appears in front surface side of the transparent substrate again, a display side of the organic EL display looks like mirror if viewed from outside.

In an organic EL display containing an organic electro luminescence illuminant equipped with a transparent electrode on a surface side of an organic luminescence layer that emits light by impression of voltage, and at the same time equipped with a metal electrode on a back side of organic luminescence layer, a retardation plate may be installed between these transparent electrodes and a polarizing plate, while preparing the polarizing plate on the surface side of the transparent electrode.

Since the retardation plate and the polarizing plate have function polarizing the light that has entered as incident light from outside and has been reflected by the metal electrode, they have an effect of making the mirror surface of metal electrode not visible from outside by the polarization action. If a retardation plate is configured with a quarter wavelength plate and the angle between the two polarization directions of the polarizing plate and the retardation plate is adjusted to π/4, the mirror surface of the metal electrode may be completely covered.

This means that only linearly polarized light component of the external light that enters as incident light into this organic EL display is transmitted with the work of polarizing plate. This linearly polarized light generally gives an elliptically polarized light by the retardation plate, and especially the retardation plate is a quarter wavelength plate, and moreover when the angle between the two polarization directions of the polarizing plate and the retardation plate is adjusted to π/4, it gives a circularly polarized light.

This circularly polarized light is transmitted through the transparent substrate, the transparent electrode and the organic thin film, and is reflected by the metal electrode, and then is transmitted through the organic thin film, the transparent electrode and the transparent substrate again, and is turned into a linearly polarized light again with the retardation plate. And since this linearly polarized light lies at right angles to the polarization direction of the polarizing plate, it cannot be transmitted through the polarizing plate. As the result, mirror surface of the metal electrode may be completely covered.

EXAMPLES

Description will be given of Examples of the present invention below.

Example Fabrication 1

Dissolved into methylene chloride were 75 parts by weight of an alternating copolymer constructed of isobutene and N-methylmaleimide (with a content of N-methylmaleimide of 50 mol %), and 25 parts by weight of acrylonitrile-styrene copolymer with a content of acrylonitrile of 28 wt % to obtain a solution with a solid matter concentration of 15 wt %. The solution was caused to flow and spread on a polyethylene terephthalate film laid on a glass plate, the wet coat was left at room temperature for 60 min and thereafter the coat was peeled off from the film. The film having been obtained by peeling-off was dried at 100° C. for 10 min, thereafter further dried at 140° C. for 10 min and thereafter still further dried at 160° C. for 30 min to thereby obtain a transparent film having a thickness of 50 μm. An in-plane phase difference Re of the transparent film was 4 nm and a thickness direction phase difference Rth thereof was 4 nm.

Note that an in-plane phase difference Re, a thickness direction phase difference Rth were calculated from refractive indexes nx, ny and nz measured with an automatic birefringence measuring instrument (manufactured by Ohji Scientific Instruments with a trade name of an automatic birefringence meter KOBRA21ADH).

Example 1

Mixed together were 4 parts by weight of silica particles having an average particle diameter 4.5 μm as fine particles, 100 parts by weight of an ultraviolet curing resin (urethane acrylate-based monomer) and 5 parts by weight of a benzophenone-based photopolymerization initiator and a solvent (toluene) having an amount weighed so as to prepare a solution having a solid matter content of 40 wt % to obtain the solution and the solution was coated on the transparent film, the wet coat was dried at 120° C. for 5 min, thereafter the dry coat was cured by irradiation with ultraviolet to form a resin coat layer (of a refractive index of 1.52) having thickness values in the range of from 3 to 5 μm and having a minute unevenness structure. In succession thereto, a fluorine-modified alkoxysilane solution of a refractive index of 1.39 was one-layer coated with a wire bar on a surface having a minute unevenness structure of the resin coat layer, the wet coat was dried and cured to obtain a low refractive index layer (having a thickness of 0.1 μm) and to thus prepare a light diffusing sheet.

Example 2

A transparent film having a thickness of 100 μm was prepared in a similar way to that in Example Fabrication 1. The film was stretched in the MD direction at 160° C. to a stretching magnification of 1.5 times and thereafter, was stretched in the TD direction at 160° C. to a stretching magnification of 1.5 times to thereby obtain a biaxially stretched transparent film having a thickness of 45 μm. An in-plane phase difference Re of the biaxially stretched transparent film was 4 nm and a thickness direction phase difference Rth thereof was 12 nm. A light diffusing sheet was prepared in a similar way to that in Example 1 with the exception that in Example 1, the biaxially stretched transparent film was used as a transparent film.

Example 3

A light diffusing sheet was prepared in a similar way to that in Example 1 with the exception that in Example 1, 15 parts by weight of polystyrene beads having an average particle diameter of 3.5 μm as fine particles were used and 0.5 parts by weight of a leveling agent (manufactured by DAINIPPON INK & CHEMICALS INC. with a trade name of Defensa MCF-323) was added into the mixed solution.

Example 4

A light diffusing sheet was prepared in a similar way to that in Example 1 with the exception that in Example 1, 6.5 parts by weight of silica particles having an average particle diameter of 1.3 μm and 6.5 parts by weight of silica particles having an average particle diameter of 2.5 μm were used as fine particles and 0.5 parts by weight of a leveling agent (manufactured by DAINIPPON INK & CHEMICALS INC. with a trade name of Defensa MCT-323) was added into the mixed solution.

Comparative Example 1

A light diffusing sheet was prepared in a similar way to that in Example 1 with the exception that in Example 1, a triacetyl cellulose film having a thickness of 80 μm (of an in-plane phase difference Re of 2 nm and a thickness direction phase difference Rth of 40 nm) was used as a transparent film.

Comparative Example 2

A light diffusing sheet was prepared in a similar way to that in Example 1 with the exception that in Example 1, a norbornene-based film having a thickness of 40 μm (of an in-plane phase difference Re of 4 nm and a thickness direction phase difference Rth of 20 nm) was used as a transparent film.

Comparative Example 3

A light diffusing sheet was prepared in a similar way to that in Example 1 with the exception that in Example 1, a biaxially stretched polycarbonate film having a thickness of 50 μm (of an in-plane phase difference Re of 10 nm and a thickness direction phase difference Rth of 120 nm) was used as a transparent film.

Comparative Example 4

A light diffusing sheet was prepared in a similar way to that in Example 1 with the exception that in Example 1, 6.5 parts by weight of silica particles having an average particle diameter of 1.3 μm and 7.5 parts by weight of silica particles having an average particle diameter of 2.5 μm were used as fine particles and 0.5 parts by weight of a leveling agent (manufactured by DAINIPPON INK & CHEMICALS INC. with a trade name of Defensa MCT-323) was added into the mixed solution.

Comparative Example 5

A light diffusing sheet was prepared in a similar way to that in Example 1 with the exception that in Example 1, no low refractive index layer was used.

Comparative Example 6

A light diffusing sheet was prepared in a similar way to that in Example 1 with the exception that in Example 1, an amount of use of silica particles was changed to 0.5 parts by weight.

A 60 gloss value was measured with a digital variable angle glossmeter UGV-5DP manufactured by Suga Test Instruments Co., Ltd. according to JIS K7105-1981 on each of the light diffusing layers of the light diffusing sheets having been obtained in Examples 1 to 4 and Comparative Examples 1 to 6 (the low refractive index layer disposed on the surface of resin coat layer). Moreover, evaluation was conducted on white blurring, reflection image, adherence, durability of the light diffusing sheets. The results of the evaluation are shown in Table 1.

(White Blurring)

A polarizing plate (185 μm) to which a light diffusing sheet had been adhered was further adhered to a glass substrate and then, a black tape was adhered to a surface on the other side of the glass substrate from the polarizing plate adhered surface and white blurring under irradiation (700 lux) with an indoor fluorescent lamp was visually evaluated using the following ratings with respective symbols.

○○: absolutely no white blurring
○: almost no white blurring
Δ: a small white blurring without a practical problem
X: extremely many white blurring (Reflection Image)

A polarizing plate (185 μm) to which a light diffusing sheet had been adhered was further adhered to a glass substrate and then, a black tape was adhered to a surface on the other side of the glass substrate from the polarizing plate adhered surface and reflection image under irradiation (700 lux) with an indoor fluorescent lamp was visually evaluated using the following ratings with respective symbols.

○: no reflection image
Δ: almost no reflection image
X: reflection image present (Adherence)

A light diffusing sheet was adhered to a glass plate with an adhesive and adherence at an initial stage was evaluated between a light diffusing layer (a resin coat layer) and a transparent film with a checker board taping test according to JIS K5400 using the following ratings with respective symbols.

○○: no peeling-off
Δ: a peeled-off area less than 65% of total square area, except a case of no-peeling-off
X: a peeled-off area of 65% or more of total square area (Durability)

A light diffusing sheet was adhered to a glass plate with an adhesive and the laminate was placed into a thermo-hygrostat at 80° C. and 90% R.H. Then, outer appearance and adherence when 570 hr and 1000 hr elapse in the thermo-hygrostat were evaluated using the following ratings with respective symbols.

○○: neither cracking nor peeling-off (over the entire surface) when 570 hr and 1000 hr elapse X: cracking and peeling-off over the entire surface when 570 hr elapses

TABLE 1

| | 60° gloss value (%) | White blurring | reflection image | adherence | durability |
|---|---|---|---|---|---|
| Example 1 | 31 | ○ | ○ | ○○ | ○○ |
| Example 2 | 32 | ○ | ○ | ○○ | ○○ |
| Example 3 | 42 | ○○ | ○ | ○○ | ○○ |
| Example 4 | 25.4 | Δ | ○ | ○○ | ○○ |
| Comparative Example 1 | 31 | ○ | ○ | ○○ | X |
| Comparative Example 2 | 31 | ○ | ○ | X | — |
| Comparative Example 3 | 31 | ○ | ○ | ○○ | ○○ |
| Comparative Example 4 | 12 | X | ○ | ○○ | ○○ |
| Comparative Example 5 | 52 | ○ | Δ | ○○ | ○○ |
| Comparative Example 6 | 63 | ○ | X | ○○ | ○○ |

It is recognized as shown in Table 1 that a light diffusing sheet of the present invention is excellent in prevention of white blurring and reflection image, adherence and durability.

Example 5

Not only was the light diffusing sheet having been prepared in Example 1 adhered to one surface of a polyvinyl alcohol-based polarizer using a polyurethane-based adhesive, but the transparent film having been prepared in Example Fabrication 1 was stacked on the other surface of the polarizer in a similar way to obtain a polarizing plate having a light diffusing function.

Example 6

Not only was the light diffusing sheet having been prepared in Example 2 adhered to one surface of a polyvinyl alcohol-based polarizer using a polyurethane-based adhesive, but the biaxially stretched transparent film having been prepared in Example 2 was stacked on the other surface of the polarizer in a similar way to obtain a polarizing plate having a light diffusing function.

Comparative Example 7

Not only was the light diffusing sheet having been prepared in Comparative Example 1 adhered to one surface of a polyvinyl alcohol-based polarizer using a polyurethane-based adhesive, but a triacetyl cellulose film was stacked on the other surface of the polarizer in a similar way to obtain a polarizing plate having a light diffusing function.

Comparative Example 8

Not only was the light diffusing sheet having been prepared in Comparative Example 3 adhered to one surface of a polyvinyl alcohol-based polarizer using a polyurethane-based adhesive, but a polycarbonate film was stacked on the other surface of the polarizer in a similar way to obtain a polarizing plate having a light diffusing function.

Two polarizing plates with a light diffusing function having been prepared in each of Examples 5 and 6, and Comparative Examples 7 and 8 are adhered to each other so that polarization axes thereof are orthogonal to each other and a transmittance (%) was measured at an azimuth of 45° from the polarization axis and a polar angle of 70°. The transmittance was measured with a spectrophotometer U-4100 manufactured by Hitachi, Ltd. at a wavelength of 550 nm. The results are shown in Table 2.

TABLE 2

| | transmittance (%) |
|---|---|
| Example 5 | 1.7 |
| Example 6 | 2.0 |
| Comparative Example 7 | 3.8 |
| Comparative Example 8 | 16.0 |

It is recognized as shown in Table 2 that a polarizing plate excellent in polarization characteristic and having a light diffusing function is obtained from a light diffusing sheet of the present invention.

INDUSTRIAL APPLICABILITY

According to the present invention, even in a case where the present invention is applied to a high definition LCD, there can be provided a light diffusing sheet, maintaining antiglare property, showing almost no white blurring to be recognized due to surface scattering, exhibiting almost no birefringence, and being excellent in adherence and durability. Moreover, according to the present invention, there can be provided an optical element on which the light diffusing sheet is attached and furthermore, an image display using the optical element.

The invention claimed is:

1. A light diffusing sheet of a structure in which a light diffusing layer is formed on at least one surface of a transparent film, the light diffusing layer including a resin coat layer having a minute unevenness shape and a low refractive index layer having a refractive index lower than that of the resin coat layer on the surface having a minute unevenness shape thereof, wherein the transparent film contains (A) a thermoplastic resin having a substituted and/or unsubstituted imide group on a side chain and (B) a thermoplastic resin having a substituted and/or unsubstituted phenyl group, and a nitrile group on a side chain, wherein the low refractive index layer is formed with a material having a polysiloxane structure, and wherein a 60° gloss value on a surface of the low refractive index layer provided on the surface of the resin coat layer is 15% or more and 50% or less in a state where the resin coat layer and the low refractive index layer are laminated.

2. The light diffusing sheet according to claim 1, wherein if a direction along which an in-plane refractive index of the transparent film is maximized is X axis, a direction perpendicular to X axis is Y axis, the thickness direction of the film is Z axis; refractive indexes in the respective axis directions are nx, ny and nz; and a thickness of the transparent film is d (nm) by definition, the following relations are met:

in-plane phase difference Re=(nx−ny)×d≦20 nm and thickness direction phase difference Rth={(nx+ny)/2−nz}×d<30 nm.

3. The light diffusing sheet according to claim 1, wherein the transparent film is a biaxially stretched film.

4. The light diffusing sheet according to claim 1, wherein the resin coat layer is formed with an ultraviolet curing resin.

5. An optical element on one surface or both surfaces of which a light diffusing sheet according to claim 1 is provided.

6. An image display using the optical element according to claim 5.

* * * * *